US009507928B2

(12) United States Patent
Fuerth

(10) Patent No.: US 9,507,928 B2
(45) Date of Patent: Nov. 29, 2016

(54) PREVENTING THE DISCOVERY OF ACCESS CODES

(71) Applicant: Red Hat, Inc., Raleigh, NC (US)

(72) Inventor: Jonathan Fuerth, Toronto (CA)

(73) Assignee: Red Hat, Inc., Raleigh, NC (US)

( * ) Notice: Subject to any disclaimer, the term of this patent is extended or adjusted under 35 U.S.C. 154(b) by 220 days.

(21) Appl. No.: 14/086,783

(22) Filed: Nov. 21, 2013

(65) Prior Publication Data

US 2015/0137944 A1    May 21, 2015

(51) Int. Cl.
*H04Q 9/00* (2006.01)
*G06F 21/36* (2013.01)
*G07C 9/00* (2006.01)
*G06F 3/0488* (2013.01)
*G06F 21/83* (2013.01)
*H04L 29/06* (2006.01)

(52) U.S. Cl.
CPC ........... *G06F 21/36* (2013.01); *G06F 3/04886* (2013.01); *G06F 21/83* (2013.01); *G07C 9/00142* (2013.01); *H04L 63/083* (2013.01)

(58) Field of Classification Search
CPC .... G06F 21/31; G06F 21/36; G07C 9/00142
USPC ...................................................... 340/5.85
See application file for complete search history.

(56) References Cited

U.S. PATENT DOCUMENTS

| | | | |
|---|---|---|---|
| 7,698,563 B2 | 4/2010 | Shin | |
| 7,705,829 B1* | 4/2010 | Plotnikov | 345/168 |
| 2003/0080945 A1* | 5/2003 | Betts-LaCroix | H01H 13/84 345/168 |
| 2004/0257238 A1 | 12/2004 | De Jongh | |
| 2006/0066589 A1* | 3/2006 | Ozawa et al. | 345/173 |
| 2006/0206919 A1 | 9/2006 | Montgomery et al. | |
| 2010/0109920 A1 | 5/2010 | Spradling | |
| 2011/0004769 A1 | 1/2011 | Won et al. | |
| 2012/0124654 A1* | 5/2012 | Senac | G06F 21/36 726/7 |
| 2012/0206584 A1* | 8/2012 | Serizawa et al. | 348/77 |

FOREIGN PATENT DOCUMENTS

| | | |
|---|---|---|
| KR | 20070096125 | 10/2007 |
| KR | 20110083356 | 11/2011 |

OTHER PUBLICATIONS

Desney S. Tan et al., Spy-Resistant Keyboard: More Secure Password Entry on Public Touch Screen Displays; Proceedings of OZCHI 2005, Canberra, Australia; Nov. 23-25, 2005, Copyright the author(s) and CHISIG, pp. 1-10.
Citibank; Your Protection is Our Priority; retrieved on Nov. 21, 2013 from https://www.online.citibank.co.in/products-services/online-services/citi-protects-you.htm?#slid; one page.

* cited by examiner

*Primary Examiner* — Vernal Brown
(74) *Attorney, Agent, or Firm* — Haynes and Boone, LLP

(57) ABSTRACT

An example method includes determining a size at which to display one or more keys of a virtual keypad and determining a symbol to display on the one or keys of the virtual keypad. The method also includes displaying the one or more keys of the virtual keypad on a computing device in accordance with a key's determined size and symbol, where a first displayed key is displayed at a different size than a second displayed key. The method further includes receiving a user input corresponding to the one or more keys and comparing the user input with a sequence of symbols. The method also includes authenticating the user in accordance with the comparison of the user input and sequence of symbols.

20 Claims, 11 Drawing Sheets

PREVENTING THE DISCOVERY OF ACCESS CODES

BACKGROUND

The present disclosure generally relates to computing devices, and more particularly to the protection of access codes.

When an access code (e.g., personal identification number (PIN)) is entered into a public terminal, the user's fingerprints are left behind. These fingerprints form an easily visible and distinctive pattern on the screen, which makes it easy for the next user of the device to determine which digits were in the previous user's password. This vulnerability also exists on personal touchscreen devices that need to be unlocked. In fact, certain setups where the user draws a pattern by dragging his or her finger on the screen are even more vulnerable than a PIN that is entered by discrete touches. A sophisticated attacker could work with an accomplice, who would wipe the touchscreen clean ahead of the target victim, meaning that the fingerprints left on the screen would only have been left by the one previous user. As more and more systems move to touchscreen interfaces, this problem becomes applicable to a broader range of situations.

A similar problem exists with PIN pads that use mechanical buttons. For example, the keypad for a home security system that has a disarm code "7740" for many years will show significantly more wear on the three digits "0," "4," and "7" than on the other unused digits. This significantly decreases the number of combinations an attacker would have to use to guess the disarm code correctly.

BRIEF SUMMARY

This disclosure relates to preventing the discovery of an access code. Methods, systems, and techniques for authenticating a user are provided.

According to an embodiment, a method of authenticating a user includes determining a size at which to display one or more keys of a virtual keypad. The method also includes determining a symbol to display on the one or more keys of the virtual keypad. The method further includes displaying the one or more keys of the virtual keypad on a computing device in accordance with a key's determined size and symbol. A first displayed key is displayed at a different size than a second displayed key. The method also includes receiving a user input corresponding to the one or more keys. The method further includes comparing the user input with a sequence of symbols. The method also includes authenticating the user in accordance with the comparison of the user input and sequence of symbols.

According to another embodiment, a system for authenticating a user includes a size unit that determines a size at which to display one or more keys of a virtual keypad. The system also includes a position unit that determines a symbol to display on the one or more keys of the virtual keypad. The system further includes a display unit that displays the one or more keys of the virtual keypad on a computing device in accordance with a key's determined size and symbol. A first displayed key is displayed at a different size than a second displayed key. The system also includes an input unit that receives a user input corresponding to the one or more keys. The system further includes an authentication unit that compares the user input with a sequence of symbols and authenticates the user in accordance with the comparison of the user input and sequence of symbols.

According to another embodiment, a non-transitory machine-readable medium includes a plurality of machine-readable instructions that when executed by one or more processors are adapted to cause the one or more processors to perform a method including: determining a size at which to display one or more keys of a virtual keypad; determining a symbol to display on the one or more keys of the virtual keypad; displaying the one or more keys of the virtual keypad on a computing device in accordance with a key's determined size and symbol, where a first displayed key is displayed at a different size than a second displayed key; receiving a user input corresponding to the one or more keys; comparing the user input with a sequence of symbols; and authenticating the user in accordance with the comparison of the user input and sequence of symbols.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

Embodiments of the present disclosure and their advantages are best understood by referring to the detailed description that follows.

DETAILED DESCRIPTION

I. Overview
II. Example System Architecture
III. Example Method
IV. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

An attacker may discover a user's password by making note of the user's hand movements on a touchscreen of a computing device. For example, if the potential victim selects an object at the upper far right side of a keypad, the attacker may guess that the user selected a "3." Accordingly, the attacker may guess that the user's access code contains a "3." Additionally, an attacker may clean the screen of a public computing device. If the user uses the public computing device, the user may leave behind his or her fingerprints on the screen. Accordingly, the attacker may be able to determine based on the fingerprints which symbols displayed on a keypad are part of the user's access code. It may be desirable to prevent the discovery of the user's access code.

The present disclosure provides methods, systems, and techniques of authenticating a user. An example method of authenticating a user includes determining a size at which to display one or more keys of a virtual keypad. The method also includes determining a symbol to display on the one or more keys of the virtual keypad. The method further includes displaying the one or more keys of the virtual keypad on a computing device in accordance with a key's determined size and symbol. A first displayed key is displayed at a different size than a second displayed key. The method also includes receiving a user input corresponding to the one or more keys. The method further includes comparing the user input with a sequence of symbols. The method also includes authenticating the user in accordance with the comparison of the user input and sequence of symbols.

II. Example System Architecture

Figure 1:
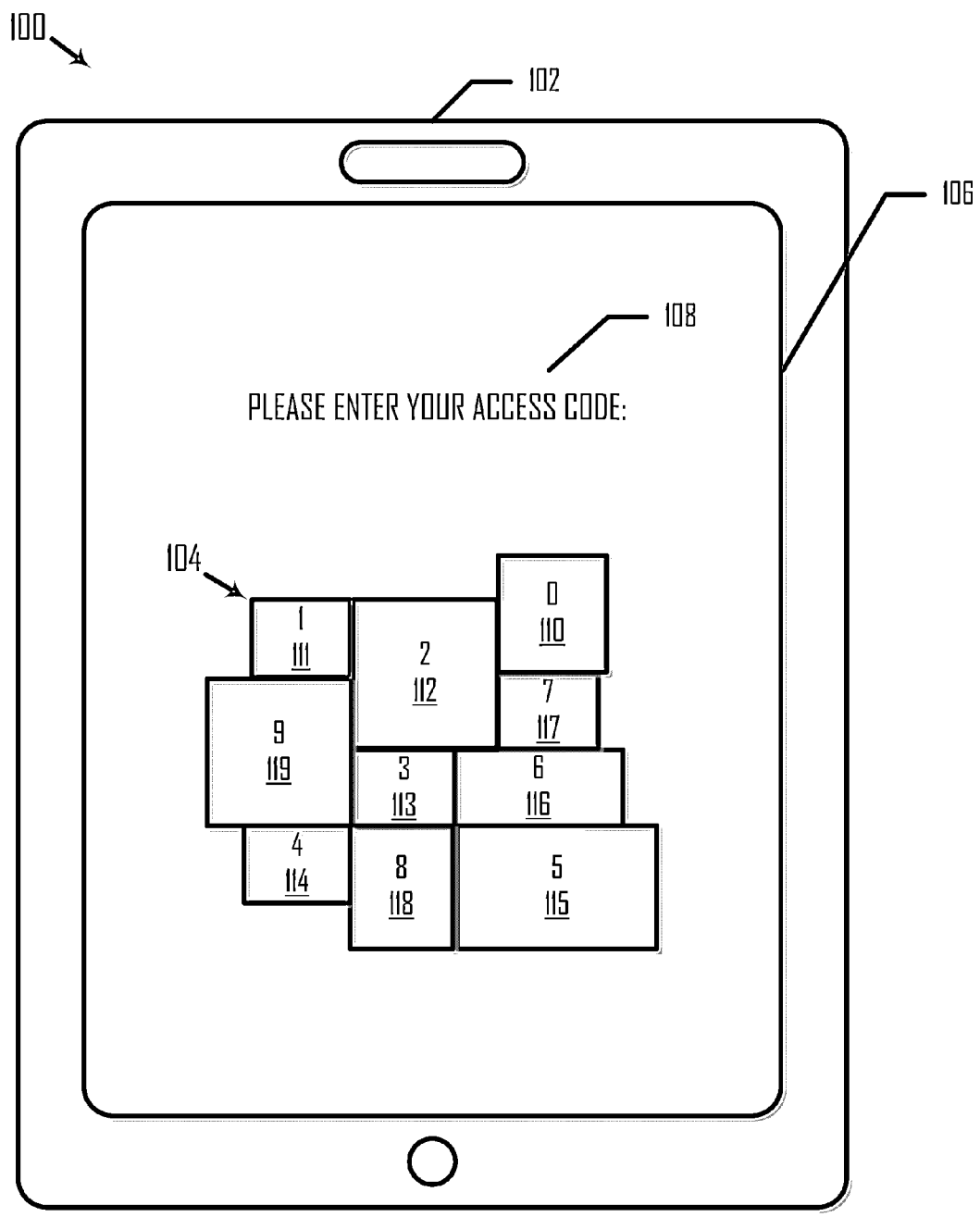
FIG. 1 is an illustration of a computing device that displays a virtual keypad on a screen, according to an embodiment.

FIG. 1 is an illustration 100 of a computing device 102 that displays a virtual keypad 104 on a screen 106, according to an embodiment. In FIG. 1, virtual keypad 104 includes different sized keys and symbols displayed on random keys of the virtual keypad. Computing device 102 may be a mobile device. The mobile device may be, for example, a smartphone, tablet, laptop, or personal digital assistant. Although computing device 102 is illustrated as being a mobile device, this is not intended to be limiting and embodiments in which computing device 102 is a stationary device are also within the scope of the disclosure. The stationary device may be, for example, a kiosk, an automatic banking machine, or retail point-of-sale credit card PIN pad.

Virtual keypad 104 includes a plurality of keys 110-109, and each key corresponds to a symbol of a set. The set of symbols includes possible symbols that are in the access code. In FIG. 1, the set of symbols includes digits 0-9, and key 110 corresponds to symbol "0," key 111 corresponds to symbol "1," key 112 corresponds to symbol "2," key 113 corresponds to symbol "3," key 114 corresponds to symbol "4," key 115 corresponds to symbol "5," key 116 corresponds to symbol "6," key 117 corresponds to symbol "7," key 118 corresponds to symbol "8," and key 119 corresponds to symbol "9." Although the symbols are illustrated as being digits, this is not intended to be limiting and other embodiments that include one or more symbols other than digits are within the scope of the disclosure. For example, a symbol may include a letter of an alphabet, special character (e.g., "!," "@," "#," "$," "%," "A," "&," "*," "(", ")", "+", etc.), shape (e.g., triangle, circle, pyramid, etc.), or any other symbol that is capable of being an entry in an access code.

Computing device 102 may store or have access to data. An owner of computing device 102 may set up an access code that a user is prompted to enter before the computing device allows a user to access its data. Accordingly, computing device 102 may display a prompt 108 that requests the user to enter the access code. Computing device 102 may allow the user access to data stored in computing device 102 if the user enters the correct access code. Computing device 102 may prevent the user from accessing data stored in computing device 102 if the user enters an incorrect access code.

Figure 2:
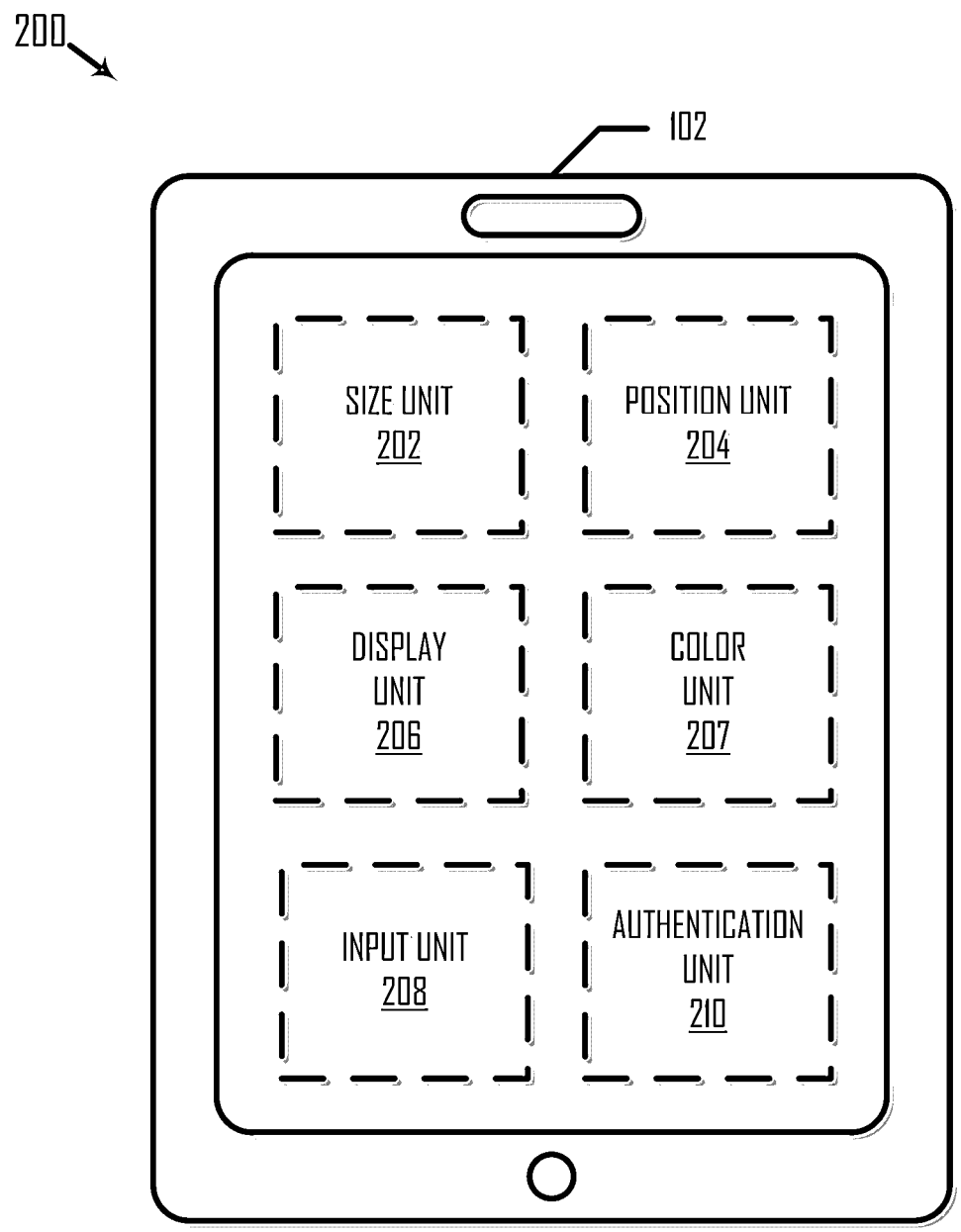
FIG. 2 is a block diagram illustrating a system for authenticating a user, according to an embodiment.

FIG. 2 is a block diagram illustrating a system 200 for authenticating a user, according to an embodiment. In FIG. 2, computing device 102 includes a size unit 202, position unit 204, display unit 206, color unit 207, input unit 208, and authentication unit 210. Size unit 202 may determine a size at which to display one or more keys of virtual keypad 104. In an example, size unit 202 maintains a list of different sizes for keys and selects one of the different sizes for a key. Display unit 206 may display one or more keys of virtual keypad 104 on screen 106 of computing device 102 in accordance with the particular key's determined size. In an embodiment, size unit 202 generates a random size at which to display the key on screen 106. In an example, a length "L" and a width "W" of computing device 102 may be known and size unit 202 may determine the size of a key by invoking a function that generates a random number less than "L" for a length of the key and/or a random number less than "W" for a width of the key. Size unit 202 may determine whether all of the keys will fit on screen 106. If size unit 202 determines that all of the keys will fit on screen 106, the keys may be displayed on screen 106. If size unit 202 determines that not all of the keys will fit on screen 106, size unit 202 may generate another random number less than "L" for a length of a given key and/or may generate another random number less than "W" for a width of the given key to determine a new size of a key. Alternatively, if size unit 202 determines that not all of the keys will fit on screen 106, size unit 202 may reduce the width of an already determined width for a key by a particular amount (e.g., 3 centimeters) and/or may reduce the length of an already determined length for a key by a particular amount (e.g., 4.5 centimeters).

The size of the keys of virtual keypad 104 may be different relative to each other. For example, a size of key 111 is different from a size of key 115. In particular, key 111 is smaller than key 115. Size unit 202 may increase or decrease the size of a key in relation to the next time that particular key is displayed. Further, size unit 104 may determine a size at which to display virtual keypad 104 on screen 106. In an example, virtual keypad 104 may take up 25 percent of the size of screen 106. Size unit 202 may increase (e.g., to 75 percent) or decrease (e.g., to 20 percent) the size at which to display virtual keypad 104 on screen 106 in relation to the next time virtual keypad 104 is displayed. Further, virtual keypad 104 may be positioned so that the right and/or bottom parts can run off the edge of screen 106 and "wrap around" to the left and/or top of screen 106 respectively.

Position unit 204 may determine a symbol of a set to display on the one or more keys of virtual keypad 104. Position unit 204 may select a symbol from the set to display on a given key. Display unit 206 may display one or more keys of virtual keypad 104 on screen 106 of computing device 102 in accordance with the particular key's determined symbol. In an embodiment, position unit 204 randomly determines the key on which to display a symbol. In an example, the symbols of the set are stored as an array with indices (e.g., symbol[0]="0", symbol[1]="1", etc.), and position unit 204 randomly generates a number between zero and the length of the array minus one. The symbol at the index corresponding to the generated number may be displayed on a given key and noted as being randomly assigned to a key of virtual keypad 104. Other techniques may be used to randomly determine the key on which to display a symbol. Accordingly, the symbol corresponding to a key of virtual keypad 104 may be random, and the symbol displayed on the key may be the same or different each time the key is displayed.

In an embodiment, after each user input (e.g., keystroke, mouse click, or digital pen input), size unit 202 may determine a different size for a key and/or position unit 204 may determine a different symbol to display on a key of virtual keypad 104. Display unit 206 may display the one or more keys of virtual keypad 104 on screen 106 of computing device 102 in accordance with a key's determined size and/or symbol. Accordingly, it may be more difficult for an attacker to determine where a symbol is displayed on screen 106 of computing device 102 and accordingly, which symbol the user selected.

Input unit 208 may receive a user input corresponding to the one or more keys. The user input may be in accordance with the user's selections of keys corresponding to symbols displayed on screen 106. In an example, screen 106 is a touchscreen that is coupled to input unit 208. The touchscreen may receive input from a user (e.g., user's finger, digital pen, and/or stylus) via the user's contact with the touchscreen. Authentication unit 210 may compare the user input with a sequence of symbols and authenticate the user in accordance with the comparison of the user input and sequence of symbols. The sequence of symbols may be an access code that computing device 102 deems to be the correct access code. As such, the sequence of symbols may be the access code that authenticates the user.

In an embodiment, computing device 102 includes a memory that stores the user's access code. In an example, the owner or administrator of computing device 102 may have programmed the access code into a memory of computing device 102. In another embodiment, a computing device (e.g., server) that is remote from computing device 102 includes a memory that stores the user's access code. In such an embodiment, the user may insert into computing device 102 a card (e.g., banking card) that is associated with the access code. Computing device 102 may send a request including the user's input to the remote computing device (e.g., banking server) over a network to determine whether the user's input matches the access code associated with the card. In an example, computing device 102 receives a response from the remote computing device that indicates the user is approved or denied access. In another example, computing device 102 receives a response from the remote computing device that includes the authorized access code and compares it to the user's input. In such an embodiment, computing device 102 may be coupled over a network.

If the user enters an incorrect access code, computing device 102 does not provide the user access to data stored in computing device 102 and may display another prompt that requests the user to enter an access code. Computing device 102 may allow the user to enter the incorrect access code a threshold number of times before the account associated with the computing device 102 is locked or the actual computing device is locked. The threshold number of times may be programmed into computing device 102.

Figure 3A:
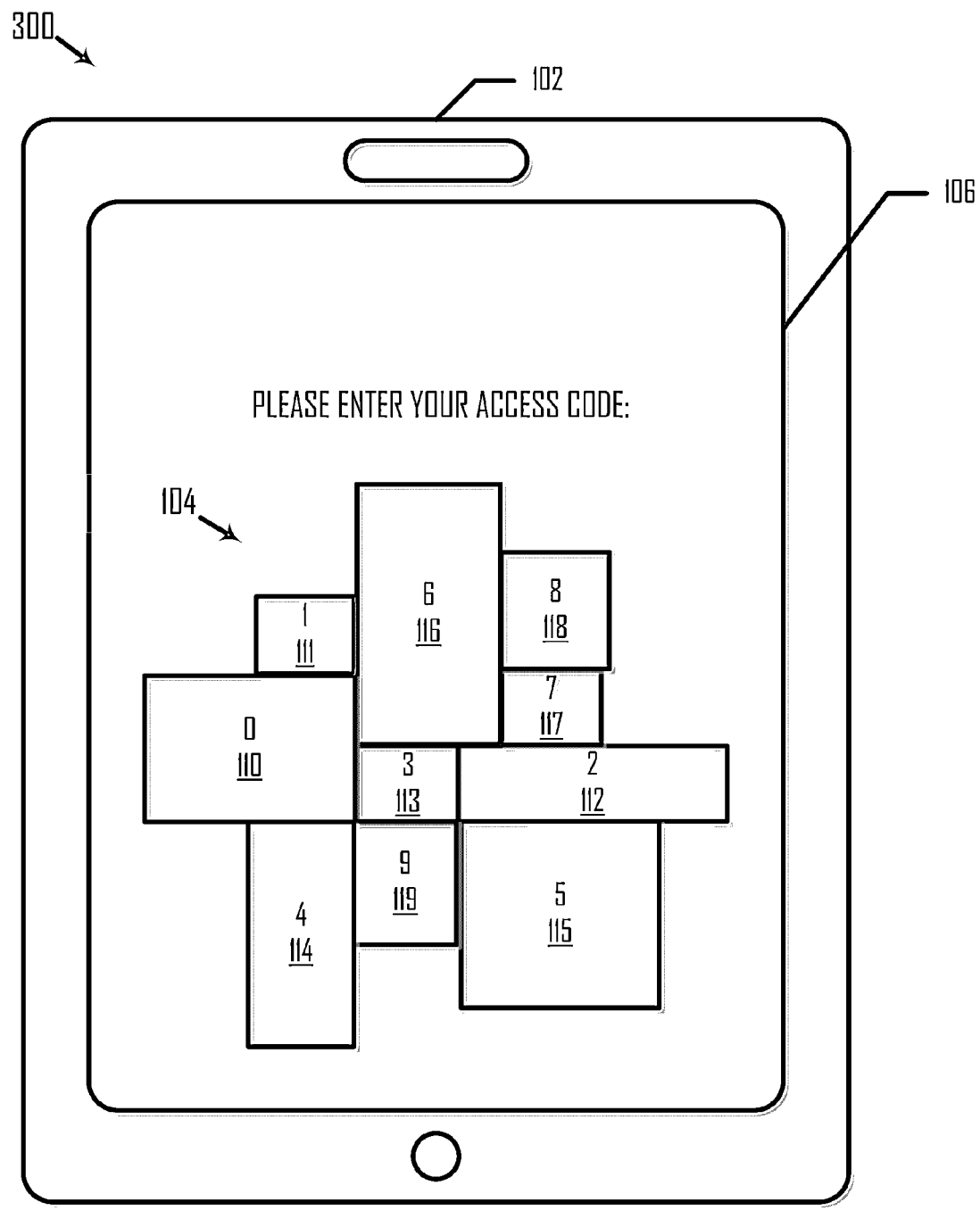
FIG. 3A is an illustration of the virtual keypad displayed with different sized keys and with symbols of a set displayed on random keys of the virtual keypad, according to an embodiment.

FIG. 3A is an illustration 300 of virtual keypad 104 displayed with different sized keys and with symbols of a set displayed on random keys of virtual keypad 104, according to an embodiment. Accordingly, the display of virtual keypad 104 on screen 106 may be modified so that a size of a key and/or a symbol on the key is randomly displayed each time virtual keypad 104 is displayed. A particular key may be displayed having a plurality of different sizes (e.g., after each user input or each time the user is prompted to enter the access code) and may correspond to a plurality of different symbols of the set. Accordingly, even if the next user of computing device 102 (e.g., attacker) may be able to see where the previous user had touched screen 106, this information would be of no practical value to the next user.

Figure 3B:
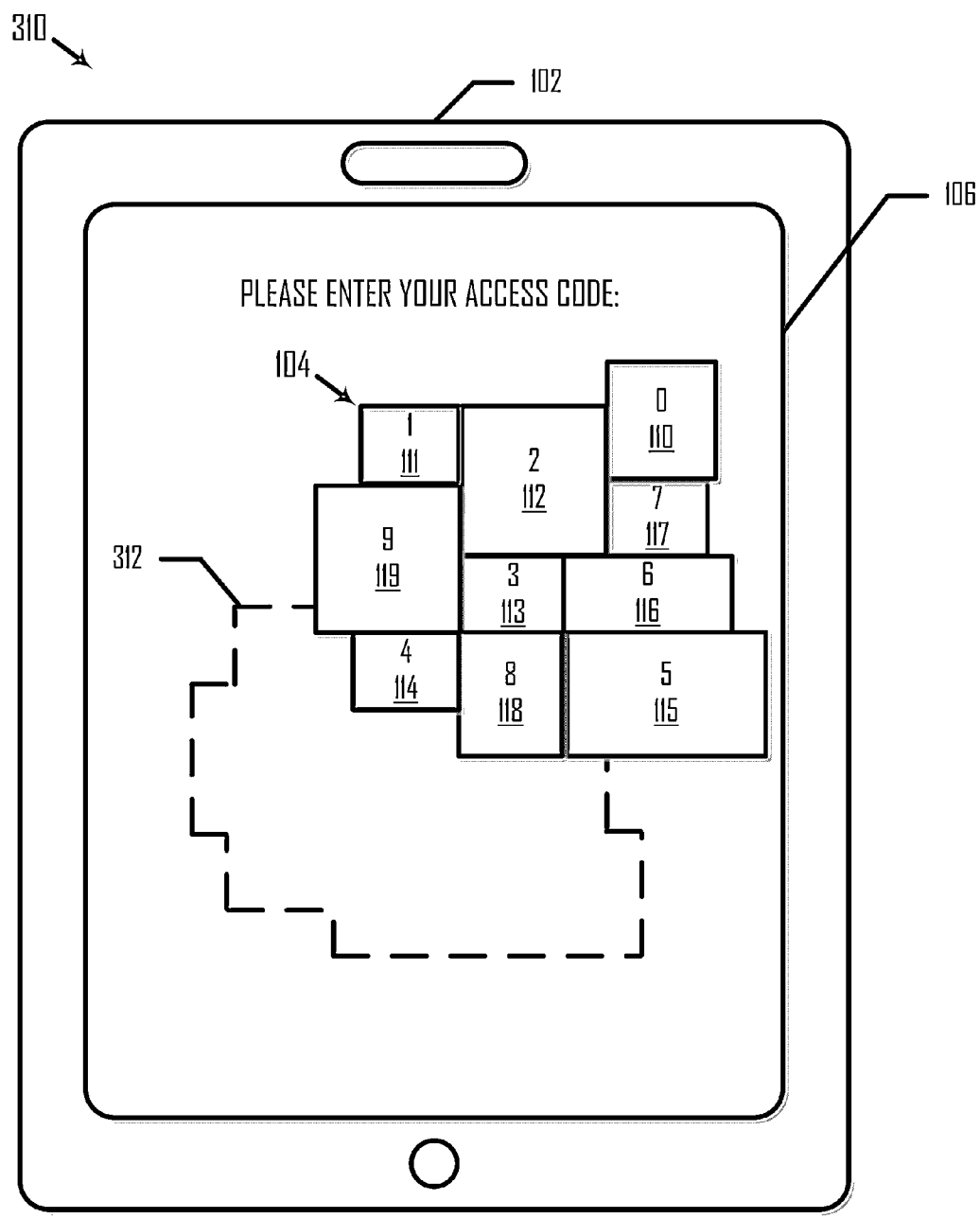
FIG. 3B is an illustration of the virtual keypad displayed at a random position on a computing device, according to an embodiment.

Display unit 206 may use other techniques to display virtual keypad 104 on screen 106 such that it is more difficult for the attacker to guess the user's access code. Display unit 206 may use one or more of the techniques disclosed in the specification to display virtual keypad 104. In an example, position unit 204 determines a random position at which to display virtual keypad 104 on screen 106. For example, virtual keypad 104 may be shifted left, right, up, and/or down compared to its previous displayed position on screen 106. In an example, position unit 204 may divide screen 106 into a grid and randomly select a position on the grid to display virtual keypad 104. In another example, position unit 204 may determine different coordinate positions on screen 106 and randomly select a particular coordinate position at which to display virtual keypad 104. Display unit 206 may display virtual keypad 104 in accordance with the determined random position on screen 106. Accordingly, virtual keypad 104 may be displayed at a plurality of random positions on screen 106. FIG. 3B is an illustration 310 of virtual keypad 104 displayed at a random position on screen 106, according to an embodiment. Using FIG. 1 as a reference, virtual keypad 104 has been shifted up and to the right of screen 106, as illustrated in FIG. 3B. Illustration 310 shows the previous position 312 of virtual keypad 104 from FIG. 2A. Thus, when a user selects "3" in FIG. 3B, it may be difficult for an attacker to determine which symbol the user selected because symbol "3" displayed on key 113 of FIG. 3B overlaps with symbol "0" displayed on key 110 of FIG. 1.

Figure 3C:
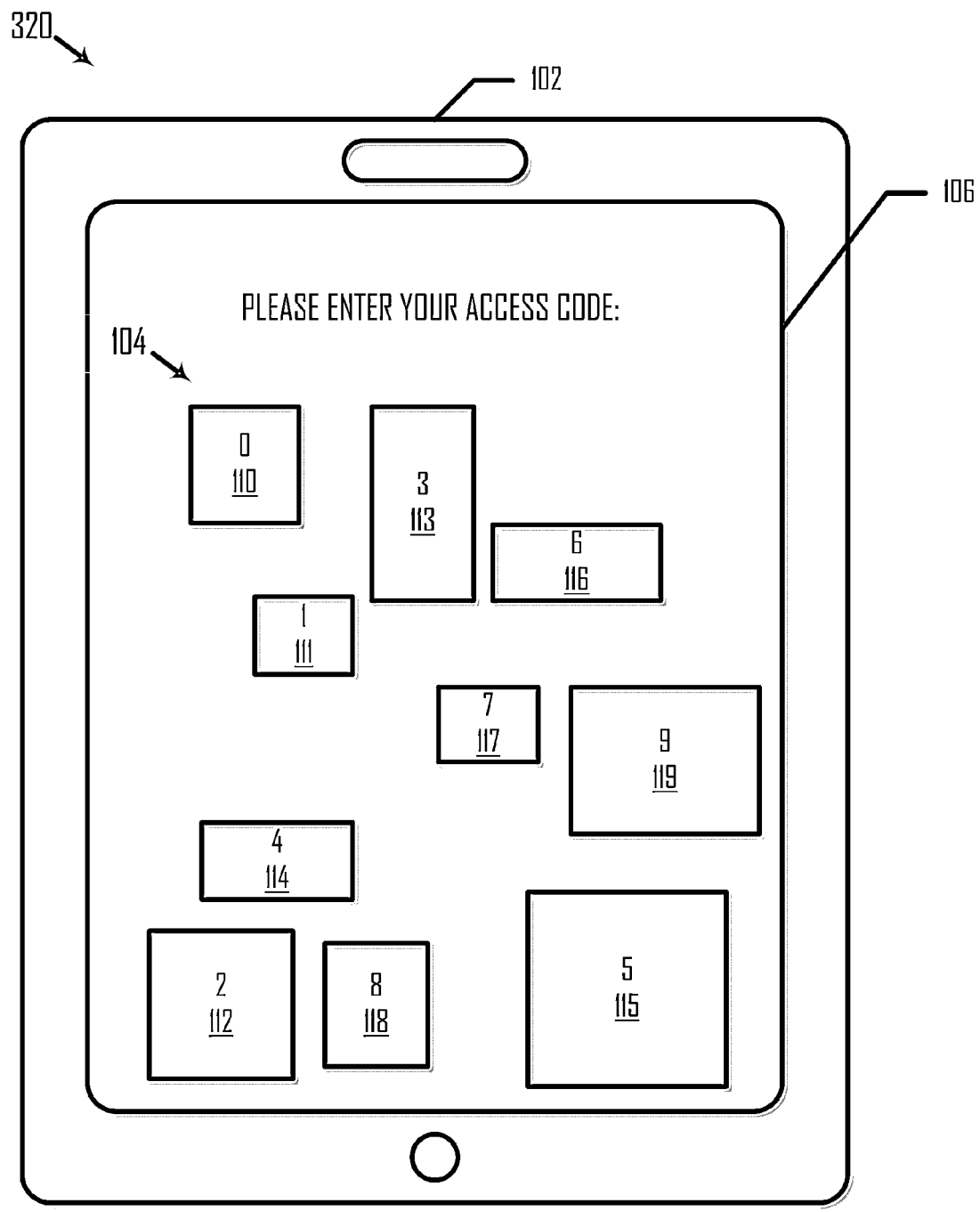
FIG. 3C is an illustration of keys of the virtual keypad displayed at random positions on the computing device, according to an embodiment.

In another example, position unit 204 determines a random position at which to display one or more keys of virtual keypad 104. For example, one or more keys of virtual keypad 104 may be shifted left, right, up, and/or down compared to its previous displayed position on screen 106. In an example, position unit 204 may divide screen 106 into a grid and randomly select a position on the grid to display a key of virtual keypad 104. In another example, position unit 204 may determine different coordinate positions on screen 106 and randomly select a particular coordinate position at which to display a key of virtual keypad 104. Display unit 206 may display a key of virtual keypad 104 in accordance with the determined random position of the key on screen 106. Accordingly, a key of virtual keypad 104 may be displayed at a plurality of random positions on screen 106. Using FIG. 1 as a reference, key 112 has been shifted down and to the left of screen 106, as illustrated in FIG. 3C. FIG. 3C is an illustration 320 of one or more keys of virtual keypad 104 displayed at a random position on screen 106, according to an embodiment.

In another example, size unit 202 determines a shape in which to display one or more keys of virtual keypad 104. For example, the shape of a key may be a heart, circle, triangle, or pyramid. Other shapes are within the scope of the disclosure. Size unit 202 may maintain a list of different shapes for keys and select one of the shapes in which to display a key of virtual keypad 104. In an example, the shapes are stored as an array with indices (e.g., shape [0]="heart", shape[1]="triangle", etc.), and size unit 202 randomly generates a number between zero and the length of the array minus one. The shape at the index corresponding to the generated number may be the shape in which to display a given key. Other techniques may be used to randomly determine the shape of a key.

Figure 3D:
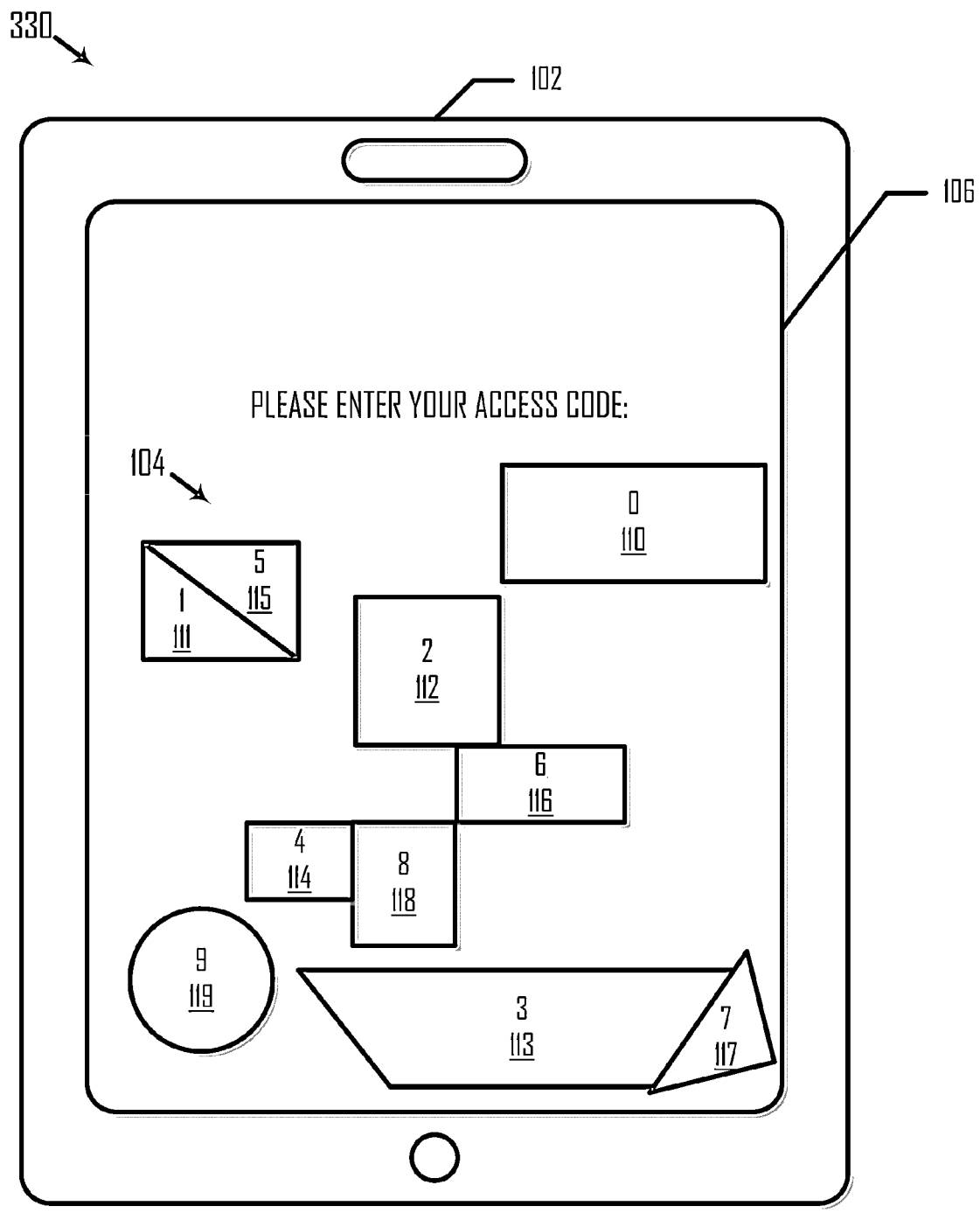
FIG. 3D is an illustration of one or more keys of the virtual keypad having a plurality of different shapes displayed on the computing device, according to an embodiment.

Display unit 206 may display the one or more keys of virtual keypad 104 in accordance with a key's determined shape. Accordingly, a key may be displayed having a plurality of different shapes. FIG. 3D is an illustration 330 of one or more keys of virtual keypad 104 having different shapes displayed on screen 106, according to an embodiment. Using FIG. 1 as a reference, the shape of key 119 is a rectangle, and the shape of key 119 has changed from a rectangle to a circle, as illustrated in FIG. 3D. In particular, the shape of key 119 in FIG. 1 is different from the shape of key 119 in FIG. 3D. Additionally, the shapes of the keys may be arranged such that it may be more difficult for an attacker to guess a symbol selected by the user. For example, keys 111 and 115 fit together like two joined puzzle pieces, and keys 113 and 117 fit together like two joined puzzle pieces. Accordingly, it may be difficult for an attacker to determine whether the user selected "1" (key 111) versus "5" (key 115) or whether the user selected "3" (key 113) or "7" (key 117). Further, the user entering the access code may have a greater impression of entering his or her access code on virtual keypad 104. In particular, the user may have a fun experience finding the different symbols displayed in the different shapes on screen 106, and the user interface may add appeal to computing device 102.

Figure 3E:
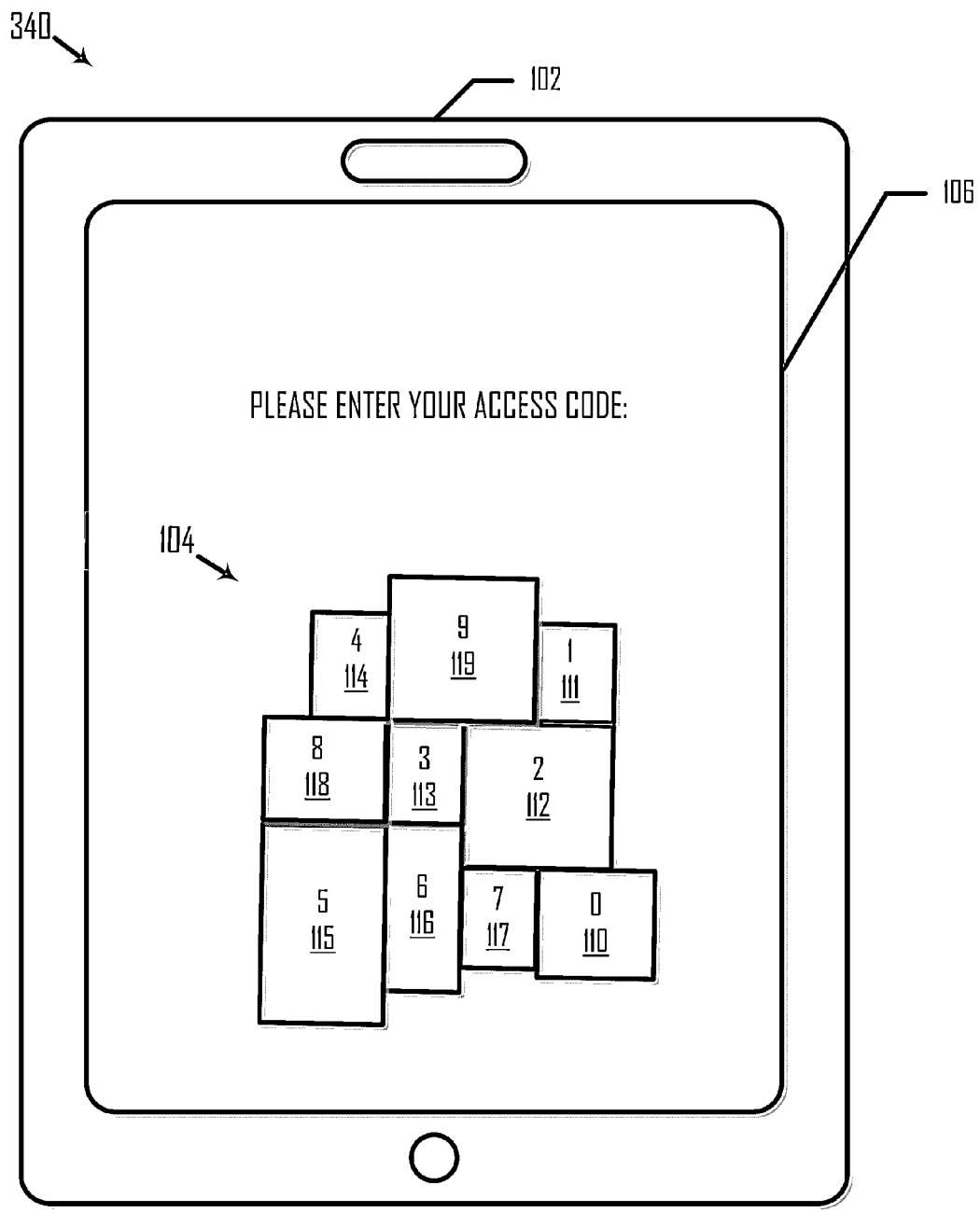
FIG. 3E is an illustration of the virtual keypad in a different orientation than in FIG. 1, according to an embodiment.

In another example, position unit 204 determines an orientation at which to display virtual keypad 104. An orientation may include a portrait orientation, landscape orientation, or tilted/rotated orientation (e.g., virtual keypad 104 is displayed at an angle relative to a bottom line of computing device 102). Position unit 204 may maintain a list of different orientations at which to display virtual keypad 104. In an example, the orientations are stored as an array with indices (e.g., orientation[0]="landscape", orientation [1]="portrait", etc.), and position unit 204 randomly generates a number between zero and the length of the array minus one. The orientation at the index corresponding to the generated number may be the orientation at which to display virtual keypad 104. In another example, position unit 204 randomly generates a number between 0 and 359 and rotates virtual keypad 104 in accordance with the randomly generated number. In such an example, if position unit 204 randomly generates the number 114, position unit 204 rotates the virtual keypad 114 degrees to the left or to the right. Other techniques may be used to determine the orientation of virtual keypad 104. Display unit 206 may display virtual keypad 104 on screen 106 of computing device 102 in accordance with the determined orientation. Displaying virtual keypad 104 at a tilted orientation may include rotating virtual keypad 104 to the left or to the right. FIG. 3E is an illustration 340 of virtual keypad 104 in a different orientation than in FIG. 1, according to an embodiment. Virtual keypad 104 in FIG. 3E is virtual keypad 104 in FIG. 1 shifted 90 degrees to the right.

In another example, position unit 204 determines a direction of movement of virtual keypad 104 on screen 106 of computing device 102. Position unit 204 may determine a direction and speed at which to move virtual keypad 104. For example, position unit 204 may select from multiple directions (e.g., right, left, up, and/or down) and speeds (e.g., slow, medium, and fast). Display unit 206 may display virtual keypad 104 on screen 106 in accordance with the determined direction of movement of virtual keypad 104. Input unit 208 may map a location of each key in virtual keypad 104 moving on screen 106 to determine which symbol is selected by the user.

In another example, position unit 204 determining a direction of movement of one or more keys of virtual keypad 104. Position unit 204 may determine a direction and speed at which to move a key of virtual keypad 104. For example, position unit 204 may select from multiple directions (e.g., right, left, up, and/or down) and speeds (e.g., slow, medium, and fast). Display unit 206 may display the one or more keys of virtual keypad 104 in accordance with the determined direction of movement of the one or more keys. Input unit 208 may map a location of each key in virtual keypad 104 moving on screen 106 to determine which symbol is selected by the user.

Figure 3F:
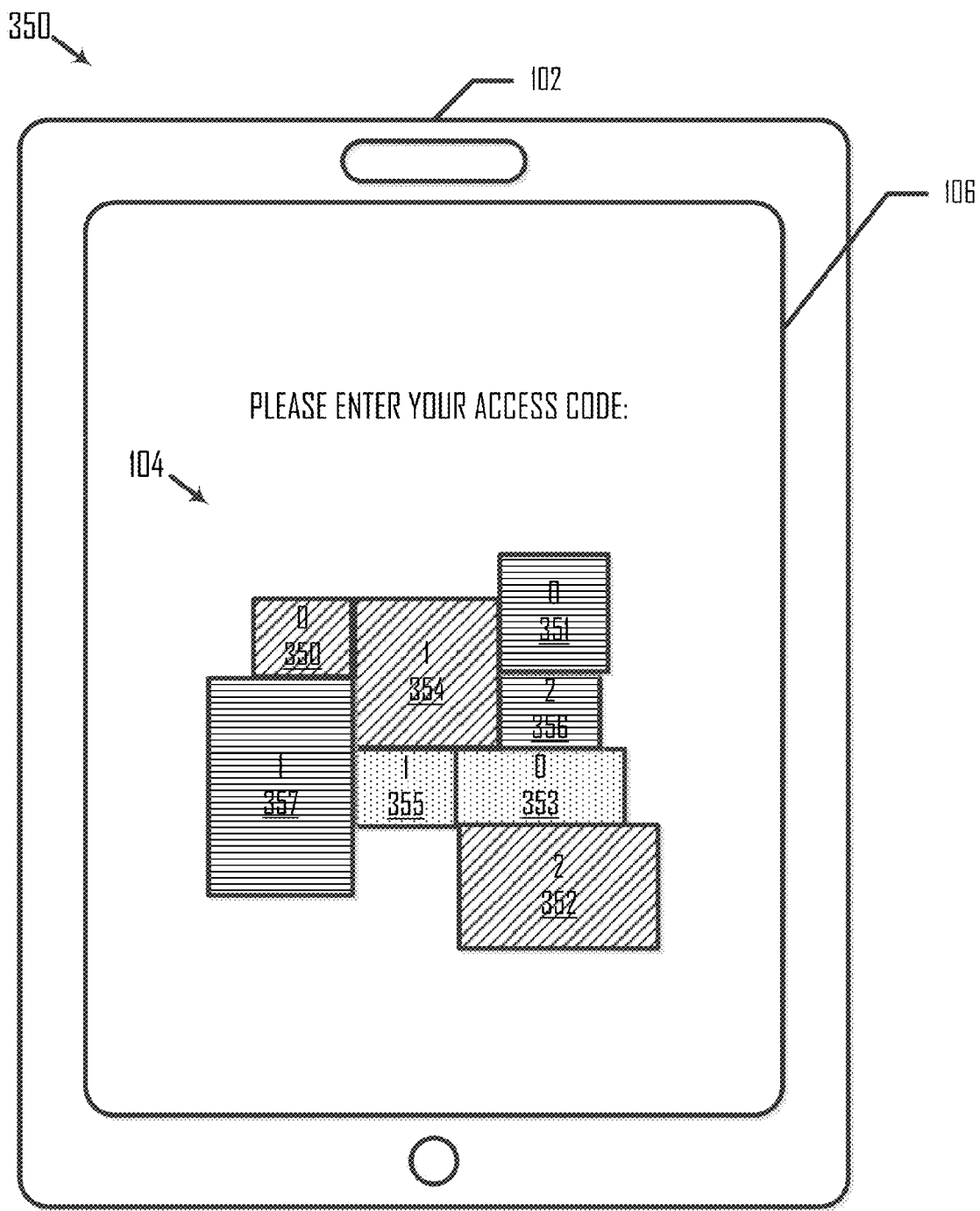
FIG. 3F is an illustration of each key of the virtual keypad being associated with a color, according to an embodiment.

In an embodiment, color unit 207 determines a color to display on one or more keys of virtual keypad 104. FIG. 3F is an illustration 350 of a color displayed on each key of virtual keypad 104, according to an embodiment. In an embodiment, a color is paired with a pattern or shape. This may be advantageous because the user may be colorblind (a significant portion of men are colorblind). In such an embodiment, the color may be used as a distinctive background pattern (e.g., red stripes, blue dots, green stars, and so on).

Although each key of virtual keypad 104 is described as displaying a color, other embodiments in which fewer than all of the keys of virtual keypad 104 display a color are also within the scope of the disclosure. Display unit 206 may display the one or more keys of virtual keypad 104 in accordance with a key's determined color.

An access word that includes symbols along with colors may be harder to break than an access code that includes only symbols. Although the access code may be described as including an element of symbols and colors, this is not intended to be limiting and the access code may include a combination of more and/or different elements. For example, another embodiment may include an access code that includes symbols, colors, and patterns (e.g., stripes, polka dots, etc.). In another example, an embodiment may include an access code that includes symbols and shapes (e.g., rectangle, heart, and trapezoid). Other embodiments may include fewer, more, and/or other elements as disclosed in the specification. Additionally, although a key of virtual keypad 104 may be described as displaying a color, it should be understood that an embodiment in which a key is associated with a color is within the scope of the disclosure. For example, rather than an actual color being displayed on the key, the key may display the color in text (e.g., "red").

A symbol displayed on a key may be associated with a color. In an example, key 310 displaying symbol "0," key 352 displaying symbol "2," and key 354 displaying symbol "1" are associated with the color red, key 351 displaying symbol "0," key 356 displaying symbol "2," and key 357 display symbol "1" are associated with the color yellow, and key 353 displaying symbol "0" and key 355 displaying symbol "1" are associated with the color green. A key may display the actual color to which the key is associated or text indicating the color (e.g., "red," "yellow," or "green") to which the key is associated. If the user's access code includes "green-0," the user may select the key displaying the symbol "0" and associated with the color green. As such, the user may select key 353.

In an embodiment, the user input includes a first sequence of symbols and a first sequence of colors that are selected by the user, and the user's access code includes a second sequence of symbols and a second sequence of colors. Authentication unit 210 may compare the first sequence of colors with the second sequence of colors and authenticate the user in accordance with the comparison of the first sequence of colors and the sequence of colors. In an example, a single input corresponds to a symbol and a color. In another example, a single input corresponds to only a color. In such an example, display unit 206 may display one or more keys of virtual keypad 104 in association with a color and no symbol. Display unit 206 may also display one or more keys having only a color and/or only a symbol. For example, a key may display only a color and another key may display only a symbol. Additionally, an access code may contain only colors. Accordingly, keys of virtual keypad 104 may visually or textually display the colors (with or without symbols), and the user may select the appropriate keys corresponding to the colors of the access code. This may make it more difficult for an attacker to guess whether the access code includes a color versus a symbol.

Figure 4:
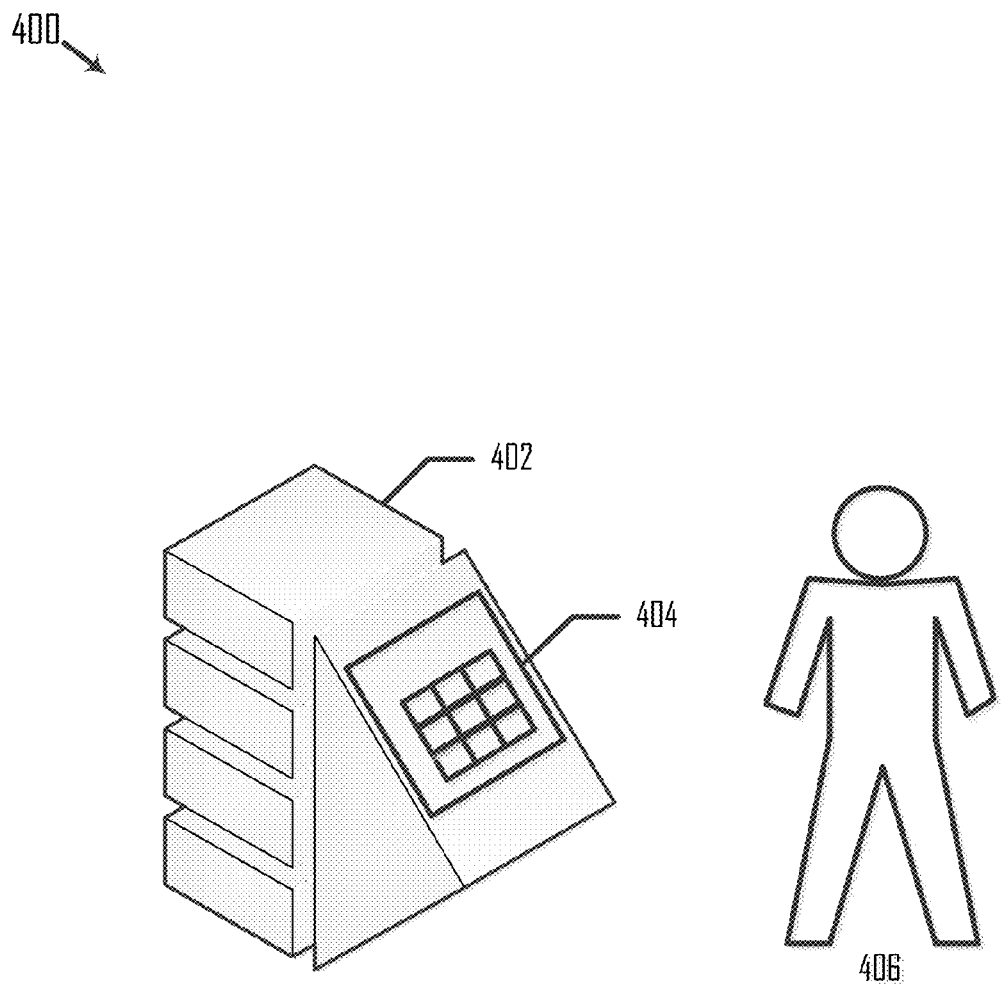
FIG. 4 is a block diagram illustrating a system that uses a physical keypad for authenticating a user, according to an embodiment.

FIG. 4 is a block diagram 400 illustrating a system that uses a physical keypad for authenticating a user, according to an embodiment. FIG. 4 includes a computing device 402 that includes a physical keypad 404 through which a user 404 may enter his or her access code. In an embodiment, keypad 404 includes physical keys (e.g., buttons) colored by backlights. The arrangement of colors displayed may change each time a key is pressed. This may evenly spread out the wear across all keys, making an attacker's job more difficult. In an embodiment, the backlights are light emitting diodes (LEDs) that are programmed to display a plurality of colors after one or more (or each) received user inputs.

It should be understood that one or more units (e.g., size unit 202, position unit 204, display unit 206, color unit 207, input unit 208, and authentication unit 210) in FIG. 2 may be combined with another unit into a single module. In an example, size unit 202 and position unit 204 are combined into a single module. It should also be understood that one or more units in FIG. 2 (e.g., size unit 202, position unit 204, display unit 206, color unit 207, input unit 208, and authentication unit 210) may be separated into more than one unit. In an example, position unit 204 is split into a first position unit (e.g., to determine a position of virtual keypad 104) and a second position unit (e.g., to determine an orientation of virtual keypad 104).

Moreover, an embodiment may include one or more of the techniques described in the disclosure. Additionally, the virtual keypad 104 may be displayed using a different technique after one or more (e.g., each) received user inputs.

III. Example Method

Figure 5:
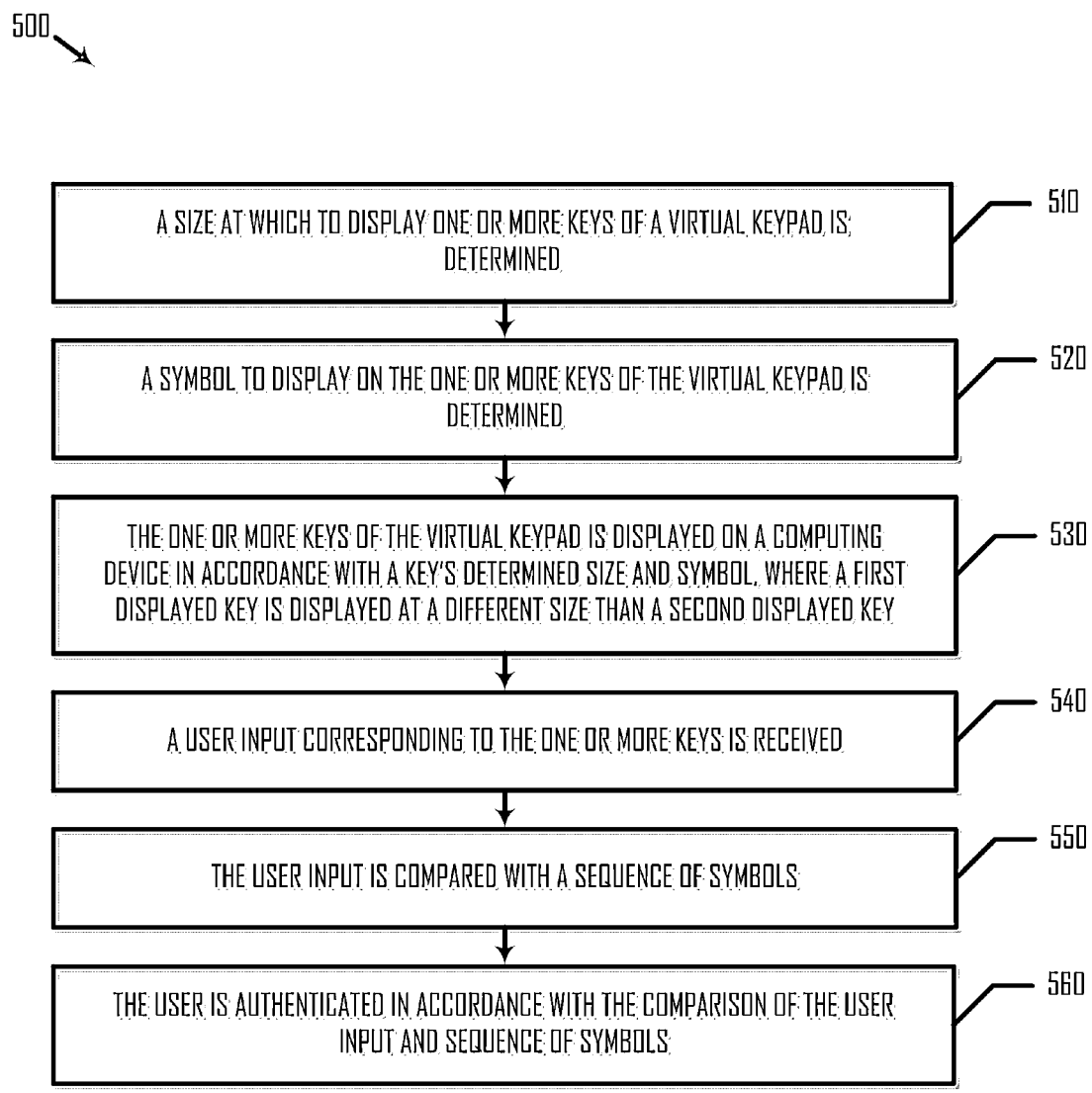
FIG. 5 is a flowchart illustrating a method of authenticating a user, according to an embodiment.

FIG. 5 is a flowchart illustrating a method 500 of authenticating a user, according to an embodiment. Method 500 is not meant to be limiting and may be used in other applications.

Method 500 includes blocks 510-560. In a block 510, a size at which to display one or more keys of a virtual keypad is determined. In an example, size unit 202 determines a size at which to display one or more keys of virtual keypad 104. In a block 520, a symbol to display on the one or more keys of the virtual keypad is determined. In an example, position unit 204 determines a symbol to display on the one or more keys of virtual keypad 104.

In a block 530, the one or more keys of the virtual keypad is displayed on a computing device in accordance with a key's determined size and symbol, where a first displayed key is displayed at a different size than a second displayed key. In an example, display unit 206 displays the one or more keys of virtual keypad 104 on computing device 102 in accordance with a key's determined size and symbol, where a first displayed key is displayed at a different size than a second displayed key. In a block 540, a user input corresponding to the one or more keys is received. In an example, input unit 208 receives a user input corresponding to the one or more keys.

In a block 550, the user input is compared with a sequence of symbols. In an example, authentication unit 210 compares the user input with a sequence of symbols. In a block 560, the user is authenticated in accordance with the comparison of the user input and sequence of symbols. In an example, authentication unit 210 authenticates the user in accordance with the comparison of the user input and sequence of symbols.

It is also understood that additional processes may be performed before, during, or after blocks 510-560 discussed above. It is also understood that one or more blocks of method 500 described herein may be omitted, combined, or performed in a different sequence as desired. For example, a block 545 (not shown) may be inserted between blocks 540 and 500. In block 545, after one press or keystroke is received from the user, the process flow proceeds back to block 510 and the virtual keys are redisplayed before accepting another press/keystroke event. The redisplayed virtual keys may be redisplayed using the techniques provided in the disclosure. This may continue until the user has entered the maximum quantity of symbols allowed in the access code or has indicated that the user is finished entering his or her password (e.g., by selecting a "done" key). In another example, in block 545, after one press or keystroke is received from the user, the process flow proceeds back to block 510 and the virtual keypad is redisplayed before accepting another press/keystroke event. The redisplayed virtual keypad may be redisplayed using the techniques provided in the disclosure. This may continue until the user has entered the maximum quantity of symbols allowed in the access code or has indicated that the user is finished entering his or her password (e.g., by selecting a "done" key). In another example, the virtual keys and/or the virtual keypad may be modified and redisplayed after each user input is received.

IV. Example Computing System

Figure 6:
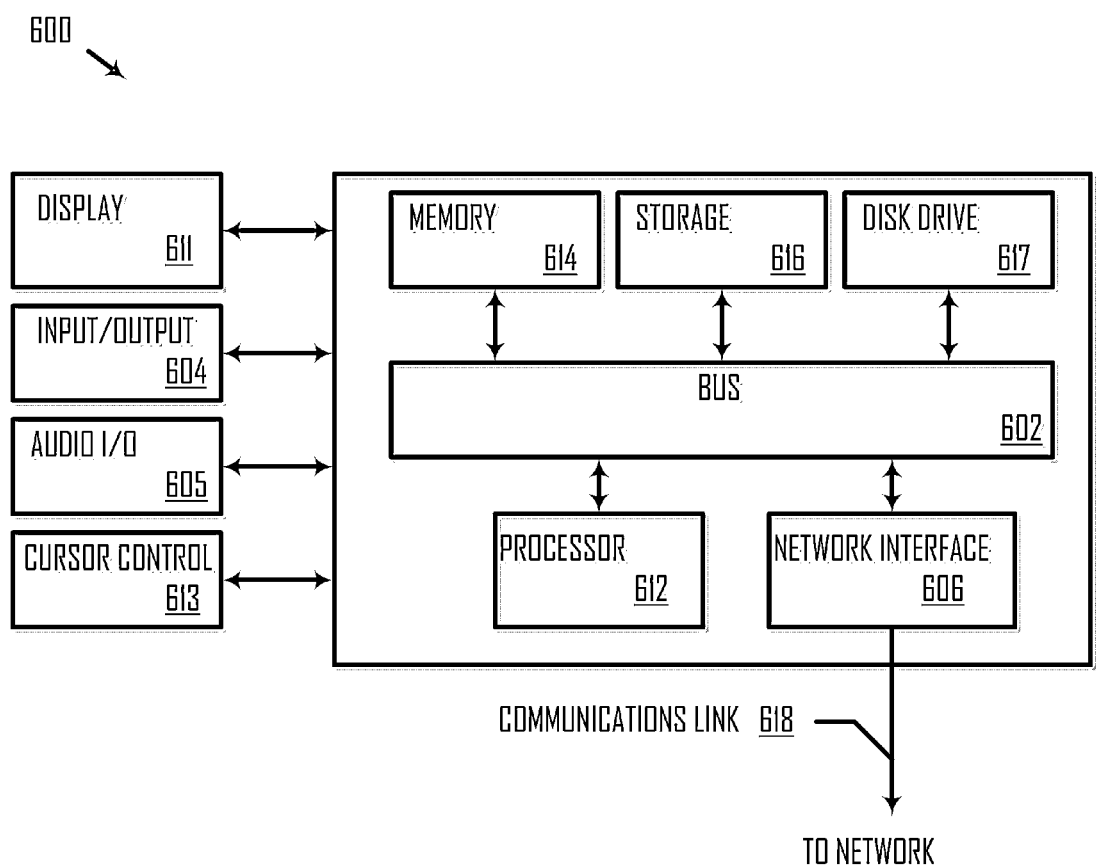
FIG. 6 is a block diagram of an electronic system suitable for implementing one or more embodiments of the present disclosure.

FIG. 6 is a block diagram of a computer system 600 suitable for implementing one or more embodiments of the present disclosure. Computing device 102 may be a client or server computing device that includes one or more processors that executes size unit 202, position unit 204, display unit 206, color unit 207, input unit 208, and/or authentication unit 210. The computing device may additionally include one or more storage devices each selected from a group consisting of floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the server using a computer network (not shown). The computer network may be any type of network including a mesh network, a LAN, a WAN, an intranet, the Internet, a cloud, and/or any combination of networks thereof that is capable of interconnecting computing devices and/or computer programs in the system. The mesh network may be a likely candidate for touchscreen PIN pads.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. I/O component 604 may also include an output component such as a display 611, and an input control such as a cursor control 613 (such as a keyboard, keypad, mouse, etc.). An optional audio I/O component 605 may also be included to allow a user to use voice for inputting information by converting audio signals into information signals. Audio I/O component 605 may allow the user to hear audio. A transceiver or network interface 606 transmits and receives signals between computer system 600 and other devices via a communications link 618 to a network. In an embodiment, the transmission is wireless, although other transmission mediums and methods may also be suitable. A processor 612, which may be a micro-controller, digital signal processor (DSP), or other processing component, processes these various signals, such as for display on computer system 600 or transmission to other devices via communications link 618. Processor 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor 612 and other components by executing one or more sequences of instructions contained in system memory component 614. Logic may be encoded in a computer readable medium, which may refer to any medium that participates in providing instructions to processor 612 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 614, and transmission media includes coaxial cables, copper wire, and fiber optics, including wires that include bus 602. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communications link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

I claim:

1. A method of authenticating a user, the method comprising:
    determining a color to display on one or more keys of a virtual keypad;
    determining a symbol to display on the one or more keys of the virtual keypad;
    displaying a first set of keys of the virtual keypad on a display coupled to a computing device in accordance with a key's determined color and symbol, wherein the same symbol is displayed on a first key and a second key of the first set of keys, and a color of the first key is different from a color of the second key;
    receiving a set of user touch inputs via the display, the set of user touch inputs corresponding to one or more keys of the virtual keypad displayed on the display, each user touch input specifying a symbol and color displayed on the selected key;
    comparing the set of user touch inputs with a sequence of symbols;
    comparing the set of user touch inputs with a sequence of colors, wherein an access code authenticates the user, and each entry in the access code specifies a symbol in the sequence of symbols and a color in the sequence of colors; and authenticating the user in accordance with the comparison of the set of user touch inputs with the sequence of symbols and the sequence of colors.

2. The method of claim 1, wherein each entry in the set of user touch inputs is sequentially compared with an entry in the access code.

3. The method of claim 1, further comprising:
determining a size at which to display the one or more keys of the virtual keypad.

4. The method of claim 1, further including:
determining a random position at which to display one or more keys of the virtual keypad, wherein displaying the first set of keys includes displaying one or more keys of the virtual keypad in accordance with a key's determined random position.

5. The method of claim 1, further including:
determining an orientation at which to display the virtual keypad, wherein displaying the first set of keys includes displaying the virtual keypad on the display in accordance with the determined orientation.

6. The method of claim 1, further including:
determining a shape in which to display one or more keys of the virtual keypad, wherein displaying the first set of keys includes displaying one or more keys of the virtual keypad in accordance with a key's determined shape, wherein the first key has a different shape than a third key of the first set of keys.

7. The method of claim 1, wherein receiving the set of user touch inputs includes receiving a first user touch input, the method further including:
displaying a second set of keys of the virtual keypad on the display after receiving the first user touch input, wherein the symbol displayed on the first key is different than a symbol displayed on a first key of the second set of keys, and the first key of the first set and the first key of the second set are displayed at the same location on the display.

8. The method of claim 1, further including:
determining a direction of movement of one or more keys of the virtual keypad, wherein displaying the first set of keys includes displaying one or more keys of the virtual keypad in accordance with the determined direction of movement.

9. The method of claim 1, wherein the access code includes a first entry and a second entry, the first entry specifies a first symbol and a first color, and the second entry specifies a second symbol and a second color, and wherein the set of user touch inputs includes a third entry and a fourth entry, the third entry specifies a third symbol and a third color, and the fourth entry specifies a fourth symbol and a fourth color.

10. The method of claim 9, wherein comparing the set of user touch inputs with the sequence of symbols includes:
comparing the first symbol with the third symbol;
comparing the first color with the third color;
comparing the second symbol with the fourth symbol; and
comparing the second color with the fourth color.

11. The method of claim 1, wherein a symbol of the set is an alphanumeric symbol.

12. A system for authenticating a user, the system comprising:
a color unit that determines a color to display on one or more keys of a virtual keypad;
a position unit that determines a symbol to display on the one or more keys of the virtual keypad;
a display unit that displays a first set of keys of the virtual keypad on a display coupled to a computing device in accordance with a key's determined color and symbol, wherein the same symbol is displayed on a first key and a second key of the first set of keys, and a color of the first key is different from a color of the second key;
an input unit that receives a set of user touch inputs via the display, the set of user touch inputs corresponding to one or more keys of the virtual keypad displayed on the display, wherein each user touch input specifies a symbol and color displayed on the selected key; and
an authentication unit that compares the set of user inputs with a sequence of symbols, compares the set of user touch inputs with a sequence of colors, and authenticates the user in accordance with the comparison of the set of user touch inputs with the sequence of symbols and the sequence of colors, wherein an access code authenticates the user, and each entry in the access code specifies a symbol in the sequence of symbols and a color in the sequence of colors.

13. The system of claim 12, wherein each entry in the set of user touch inputs is sequentially compared with an entry in the access code.

14. The system of claim 12, further including:
a first memory that stores the access code.

15. The system of claim 12, wherein the size unit determining a size at which to display the one or more keys of the virtual keypad.

16. The system of claim 12, wherein the position unit determines a random position at which to display one or more keys of the virtual keypad, and the display unit displays the first set of keys of the virtual keypad in accordance with a key's determined random position.

17. The system of claim 12, wherein the size unit determines a shape in which to display one or more keys of the virtual keypad, and the display unit displays the first set of keys of the virtual keypad in accordance with a key's determined shape, wherein the first key has a different shape than a third key of the first set of keys.

18. The system of claim 12, wherein the set of user touch inputs includes a user touch input corresponding to the first key of the first set of keys.

19. The system of claim 12, further including:
a touchscreen coupled to the input unit, wherein the input unit receives the set of user touch inputs via the touchscreen.

20. A non-transitory machine-readable medium comprising a plurality of machine-readable instructions that when executed by one or more processors is adapted to cause the one or more processors to perform a method comprising:
determining a color to display on one or more keys of a virtual keypad;
determining a symbol to display on the one or more keys of the virtual keypad;
displaying a first set of keys of the virtual keypad on a display coupled to a computing device in accordance with a key's determined color and symbol, wherein the same symbol is displayed on a first key and a second key of the first set of keys, and a color of the first key is different from a color of the second key;
receiving a set of user touch inputs via the display, the set of user touch inputs corresponding to one or more keys of the virtual keypad displayed on the display, each user touch input specifying a symbol and color displayed on the selected key;
comparing the set of user touch inputs with a sequence of symbols;
comparing the set of user touch inputs with a sequence of colors, wherein an access code authenticates the user, and each entry in the access code specifies a symbol in the sequence of symbols and a color in the sequence of colors; and authenticating the user in accordance with the comparison of the set of user touch inputs with the sequence of symbols and the sequence of colors.

\* \* \* \* \*